(12) United States Patent
Kosaka (10) Patent No.: US 6,516,146 B1
(45) Date of Patent: Feb. 4, 2003

(54) ACTUATOR USING SHAPE MEMORY ALLOY AND METHOD FOR CONTROLLING THE SAME

(75) Inventor: Akira Kosaka, Yao (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/713,312

(22) Filed: Nov. 16, 2000

(30) Foreign Application Priority Data

Nov. 16, 1999 (JP) .......................................... 11-324948

(51) Int. Cl.$^7$ ........................ G03B 17/00; G03B 15/03; H02N 10/00
(52) U.S. Cl. ......................... 396/55; 396/177; 60/528; 310/307; 318/117; 148/402
(58) Field of Search ........................... 396/55, 89, 177, 396/257; 310/307; 60/528; 318/117; 148/563, 402

(56) References Cited

U.S. PATENT DOCUMENTS

| | | | |
|---|---|---|---|
| 4,860,040 A | * 8/1989 | Tamamura et al. ........... 396/89 |
| 4,932,210 A | 6/1990 | Julien et al. ................. 60/527 |
| 5,185,621 A | 2/1993 | Kagechika .................. 396/443 |
| 5,459,544 A | 10/1995 | Emura ........................ 396/257 |
| 6,157,779 A | 12/2000 | Kosaka et al. ................. 396/55 |

* cited by examiner

Primary Examiner—W. B. Perkey
(74) Attorney, Agent, or Firm—McDermott, Will & Emery (57) ABSTRACT

An actuator using a novel shape memory alloy which, even when there is a large difference between a transformation start temperature of the shape memory alloy and a heating start temperature, can diminish a time lag based on the temperature difference from the time when an operation start command signal is outputted until the start of movement of an actuating member, thereby causing, the actuating member to start deformation quickly and permitting a driven member to be actuated quickly. When the driven member is moved from an initial position to a reference position in operation, if the amount of movement of the driven member is larger than a normal amount of movement, an electric current larger than an electric current value calculated from the amount of movement is fed to the actuating member which is constructed of the shape memory,alloy, thereby causing the actuating member to be displaced quickly to actuate the driven member quickly.

13 Claims, 9 Drawing Sheets

ACTUATOR USING SHAPE MEMORY ALLOY AND METHOD FOR CONTROLLING THE SAME

This application is based on the patent application No. 11-324948 filed in Japan, the contents of which are hereby incorporated by reference.

BACKGROUND OF THE INVENTION

1. Field of the Invention

This invention relates to an actuator using shape memory alloy and method for controlling the actuator.

2. Prior Art

The shape memory alloy possesses a characteristic such that once it is set to a predetermined shape at a temperature in a predetermined high temperature range, say, 60° C. and the shape thus set is memorized, then even if the shape memory alloy is transformed into a shape different from the memorized shape at a lower temperature in a normal temperature range, say, 20° C., it transforms to the memorized shape on heating to a temperature above the transformation temperature thereof, say, 60° C.

There is known an actuator which utilizes the above characteristic and which has an actuating member constructed of a shape memory alloy. In this known actuator, for example the actuating member is formed using a wire of a shape memory alloy, and a predetermined first shape, e.g., a shrunk shape, is memorized beforehand in the actuating member at a predetermined high temperature region, while at a lower, normal temperature region, an external force is applied to the actuating member with a biasing spring or the like to transform the actuating member into a second shape, e.g., an extended shape, different from the first shape and a driven member is connected to the actuating member, which driven member is set at a second position.

In this state, if the actuating member of the shape memory alloy is heated to a temperature above the transformation temperature thereof, the actuating member transforms to the memorized first shape thereof, i.e., the shrunk shape, from its second shape, or extended shape, whereby the driven member connected to the actuating member can be shifted from the second to the first position.

Then, when the actuating member of the shape memory alloy is cooled to a normal temperature, it is transformed again into its second shape, or extended shape, with an external force, say, the force of a spring, whereby the driven member connected to the actuating member can be restored from its first position to its second position, i.e., its initial position.

When an actuating member formed using a shape memory alloy is supplied with an electric current and is heated, there occurs a displacement corresponding to the electric current. This is because the quantity of heat generated in the actuating member of the shape memory alloy at a certain current value and the quantity of heat radiated to the ambient air of the actuating member has been balanced and the actuating member is held at a certain temperature. Thus, there is a close relation between the temperature and displacement of the actuating member.

Due to the above temperature displacement characteristic of the actuating member constructed of a shape memory alloy it turned out that the actuator formed by the shape memory alloy involved the following two problems to be solved.

The first problem is that if the ambient temperature exceeds the transformation temperature of the shape memory alloy, the actuating member transforms to its memorized shape and causes an operation which is not intended, even when the actuator is not to be operated. As long as the actuator is held at an ambient temperature which is a transformation temperature of the shape memory alloy, the transformed state of the actuating member to its memorized shape is continued, which is inconvenient.

As a countermeasure, in a device having an actuating member formed of a shape memory alloy, a transformation starting temperature of the shape memory alloy is set higher than an operation ensuring temperature range of the device. According to this method, however, since there is a wide difference between the transformation starting temperature of the shape memory alloy and a heating start temperature (generally a normal temperature), a considerable time is required for the actuating member of the shape memory alloy to be heated up to the transformation starting temperature and there arises a time lag from the output of an operation start signal to the device until the start of actual operation.

The second problem is that a drive unit using a shape memory alloy adopts a construction wherein an actuating member formed of the shape memory alloy is urged, for example pulled, with a biasing spring or the like. Therefore, in the initial state in which the actuating member of the shape memory alloy is not heated with an electric current, the actuating member is kept extended by the spring. When a reference position at the start of operation of the drive unit is set at an intermediate position of displacement induced in the actuating member, it is necessary to induce a displacement by heating the actuating member from the initial state in which the actuating member is not heated, up to the reference position as an intermediate position of displacement, thus causing a time lag, which is inconvenient.

SUMMARY OF THE INVENTION

It is a primary object of the present invention to provide an actuator using a novel shape memory alloy and capable of actuating a driven member quickly in response to an operation start command signal, as well as a control method for the actuator.

It is another object of the present invention to provide an actuator using a novel shape memory alloy and capable of diminishing a time lag from the output of an operation start command signal until the start of movement of an actuating member of the actuator, which time lag is based on the difference between a transformation start temperature of the shape memory alloy and a heating start temperature, thereby allowing the actuating member to start deformation quickly, and hence capable of actuating a driven member quickly, as well as a control method for the actuator.

It is a further object of the present invention to provide an actuator using a novel shape memory alloy and capable of being used for actuating an optical element which corrects an image shake caused by hand-shake of a camera.

It is a still further object of the present invention to provide an actuator using a novel shape memory alloy and capable of being used for actuating a component of a camera.

Other objects of the present invention will become apparent from the following detailed description of the invention taken in connection with the accompanying drawings.

DETAILED DESCRIPTION OF THE PREFERRED EMBODIMENTS

In the embodiment of the present invention about to be described, an actuator using a shape memory alloy according to the invention is applied to a compensating optical system to correct image shake caused by hand-shake of a camera.

Figure 1:
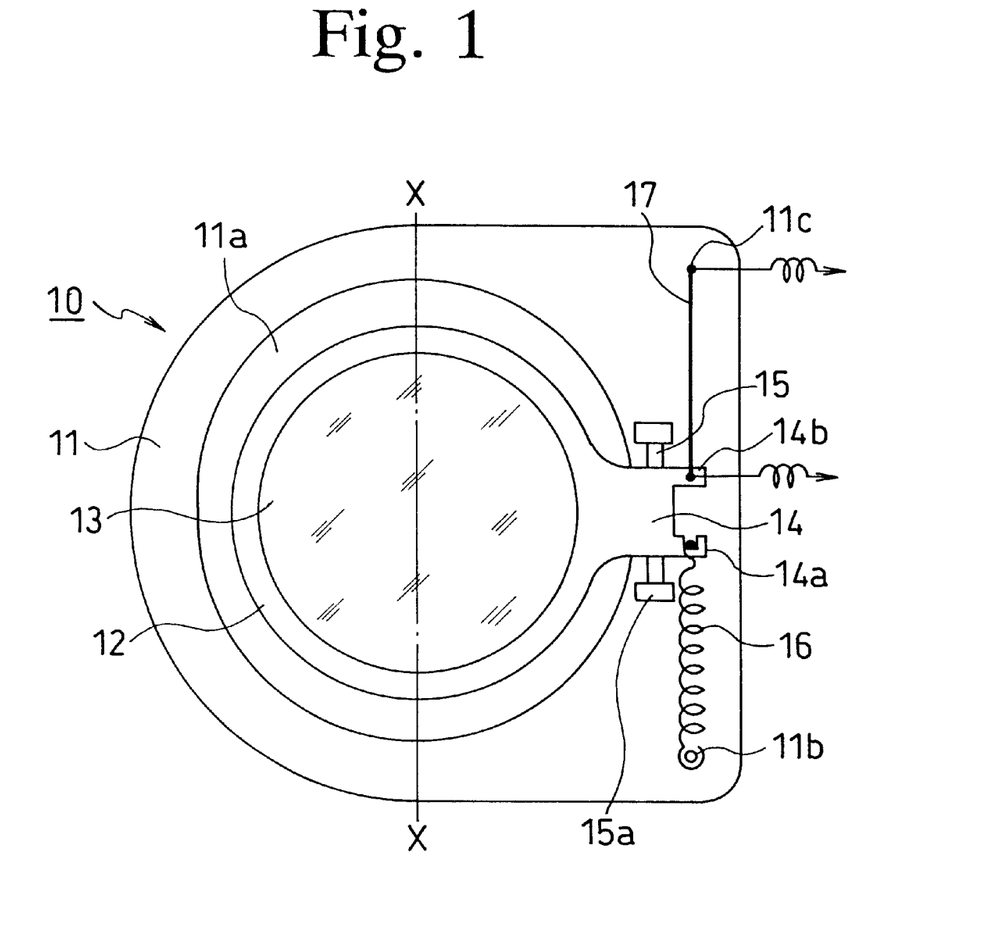
FIG. 1 is a front view of a compensating lens drive unit in a compensating optical system (with a compensating lens located at a reference position)
Figure 2:
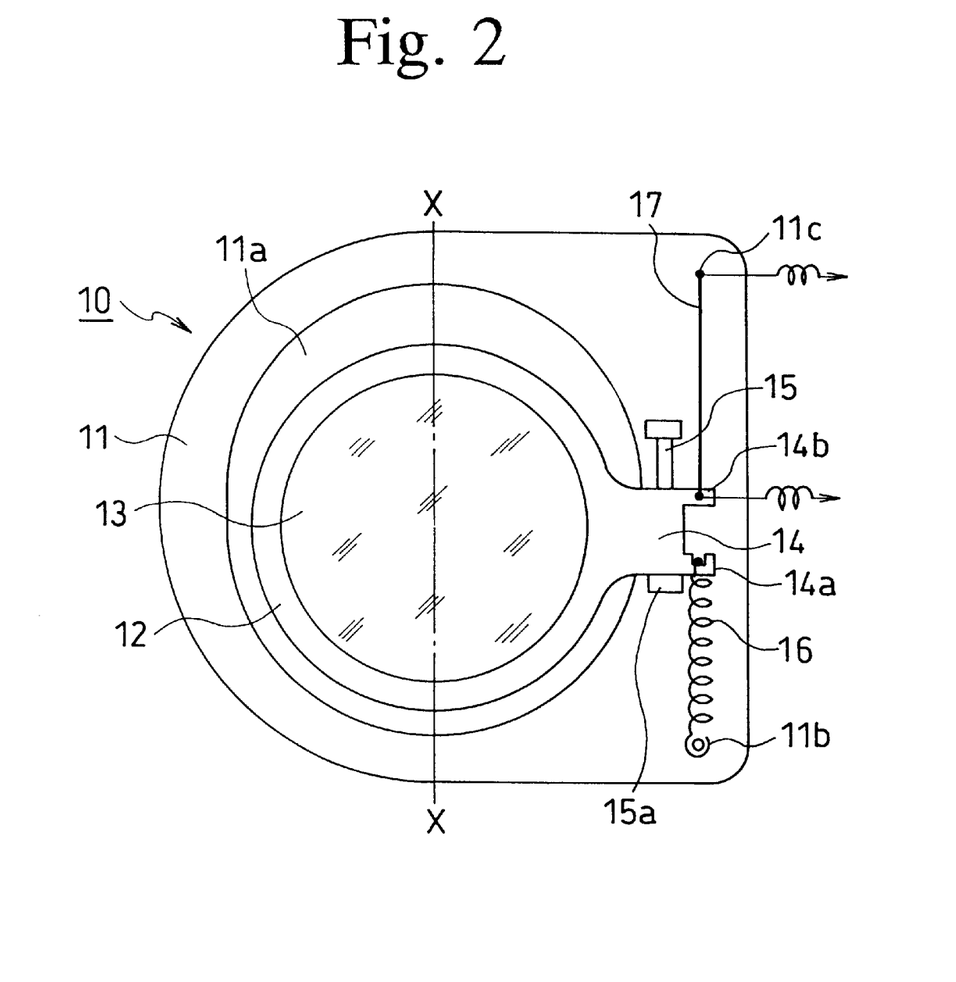
FIG. 2 is a front view similar to FIG. 1 (with the compensating lens located at an initial position)

FIGS. 1 and 2 are front views of a compensating lens drive unit in a compensating optical system. FIG. 1 shows a state in which a compensating lens is set at a reference position, i.e., a stand-by position, and FIG. 2 shows a state in which the compensating lens is in an initial position thereof with no electric current supplied to the compensating lens drive unit.

The compensating optical system is constituted by two sets of compensating lens drive units having the construction shown in FIGS. 1 and 2. More specifically, the compensating optical system which corrects image shake on XY plane perpendicular to an optical axis is constituted by combining a first compensating lens drive unit which moves a first compensating lens in X axis direction and a second compensating lens drive unit which moves a second compensating lens in Y direction. Since the first and second compensating lens drive units are of the same construction, the following description will be directed to only the first compensating lens drive unit.

If a second drive unit for moving the whole of the first compensating lens drive unit in Y axis direction is provided in addition to the first compensating lens drive unit, it is possible to constitute a compensating optical system which corrects image shake by moving a single compensating lens on XY plane perpendicular to the optical axis.

A first compensating lens drive unit 10 will now be described with reference to FIGS. 1 and 2. Numeral 11 denotes a fixed frame having a central opening 11a, the fixed frame 11 being installed into a lens barrel of a lens system (not shown). Within the opening 11a is positioned a holding frame 12 which holds a compensating lens 13 and which constitutes a driven member. At one end of the holding frame 12 is formed an arm 14 which is adapted to be guided by a shaft 15 disposed in X axis direction on the fixed frame 11, whereby the holding frame 12 is supported slidably in X axis direction.

Between a pin 11b formed on the fixed frame 11 and a hook 14a formed on the arm 14 of the holding frame 12 is stretched a biasing spring 16 which is constituted by a resilient member such as a coiled spring. Likewise, between a pin 11c formed on the fixed frame 11 and a pin 14b formed on the arm 14 of the holding frame 12 is provided a wire 17 formed of a shape memory alloy and constituting an actuating member.

A shrunk shape of a predetermined size is memorized beforehand in the wire 17 of the shape memory alloy, and when the wire is heated electrically to a predetermined temperature, the shape of the wire transforms to the memorized shape.

With no electric current flowing through the wire 17, the holding frame 12 is pulled downward in FIG. 1 with the biasing force of the spring and one end of the arm 14 is in abutment against a large-diameter portion 15a at an end of the shaft 15, assuming an initial position shown in FIG. 2 (an OFF position of electric supply to the wire).

Next, when the wire 17 of the shape memory alloy is heated by being charged with an electric current of a predetermined current value (a reference position current value), the wire transforms into a predetermined shrink deformation, and generating a force of pulling the holding frame 12 upward in FIG. 2, so that the downward pulling force of the biasing spring 16 and the upward pulling force of the wire 17 balance each other, whereby the holding frame 12 is located at a reference position (stand-by position) corresponding to a zero (0) quantity of image shake correction shown in FIG. 1.

Once image shake correction operation is started, an electric current with a magnitude proportional to the amount of compensation flows through the wire 17 of the shape memory alloy. If the current value proportional to the amount of compensation is larger than the reference position current value detected at the time of installing the holding frame 12 in the reference position, the amount of shrink deformation of the wire 17 becomes larger, so that the holding frame 12 moves in a positive X axis direction (toward the wire 17) with respect to the reference position.

If the current value proportional to the amount of compensation is smaller than the reference position current value, the amount of shrink deformation of the wire 17 becomes smaller, so that the holding frame 12 moves in a negative X axis direction (toward the biasing spring 16) with respect to the reference position.

The above is also the case with the compensating lens drive unit which moves the compensating lens in Y axis direction. By combining two drive units there can be constituted a compensating optical system for correcting image shake on XY plane perpendicular to the optical axis. The compensating optical system is installed into a lens barrel of a lens system (not shown). It goes without saying that the construction concerned can be designed suitably by using known means.

The wire of the shape memory alloy is identified by reference numeral 17 in the above description, but in the following description the wire used in the drive unit for moving the compensating lens in X axis direction will be identified by reference numeral 17X and the wire used in the drive unit for moving the compensating lens in Y axis direction will be identified by reference numeral 17Y.

Figure 3:
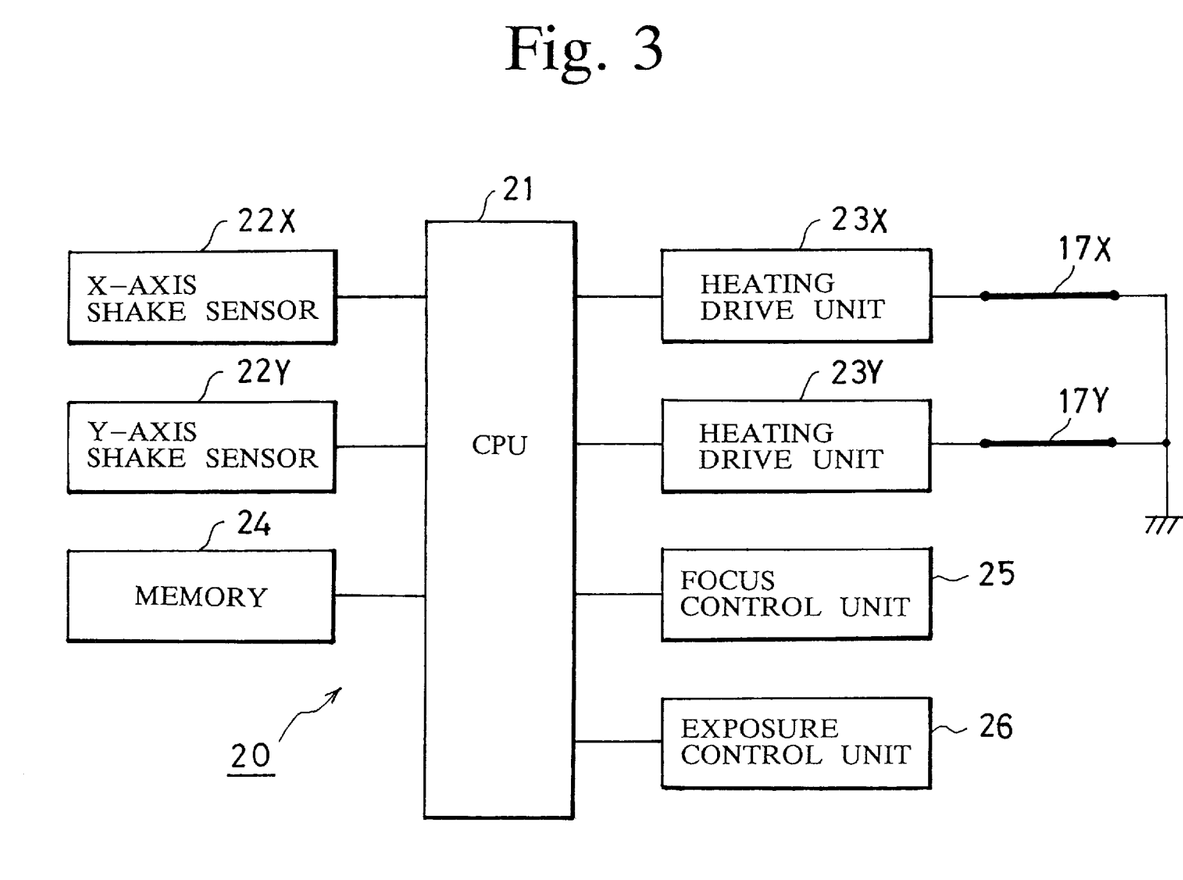
FIG. 3 is a block diagram showing a control circuit for controlling the compensating optical system.

FIG. 3 is a block diagram showing the configuration of a controller 20 which is for controlling the compensating optical system. The controller 20 is constituted mainly by a CPU 21. To an input/output port of the CPU 21 are connected X-axis shake sensor 22X and Y-axis shake sensor 22Y, heating drive units 23X and 23Y for heating the wires 17X and 17Y, a memory 24, a focus control unit 25, and an-exposure control unit 26.

The X-axis shake sensor 22X and Y-axis shake sensor 22Y detect the magnitude of hand-shake in X axis direction and that in Y axis direction of a camera. For example, angular velocity sensors are used. Both sensors are disposed at suitable positions within the camera body.

In the memory 24 are stored current value data to be applied to the wires 17X and 17Y for heating which correspond to the amount of image shake correction. This is for the following purpose.

By measuring before hand a relation between the magnitude of an electric current flowing through each wire of the shape memory alloy and the magnitude of the amount of deformation to a memorized shape, and by determining beforehand the amount of deformation of the wire proportional to the amount of image shake correction, it is intended to obtain a current value corresponding to the amount of image shake correction which has been calculated on the basis of hand-shake magnitudes detected by the X-axis shake sensor 22X and Y-axis shake sensor 22Y.

The current to be applied to the wire may be supplied in pulse form.

Figure 4:
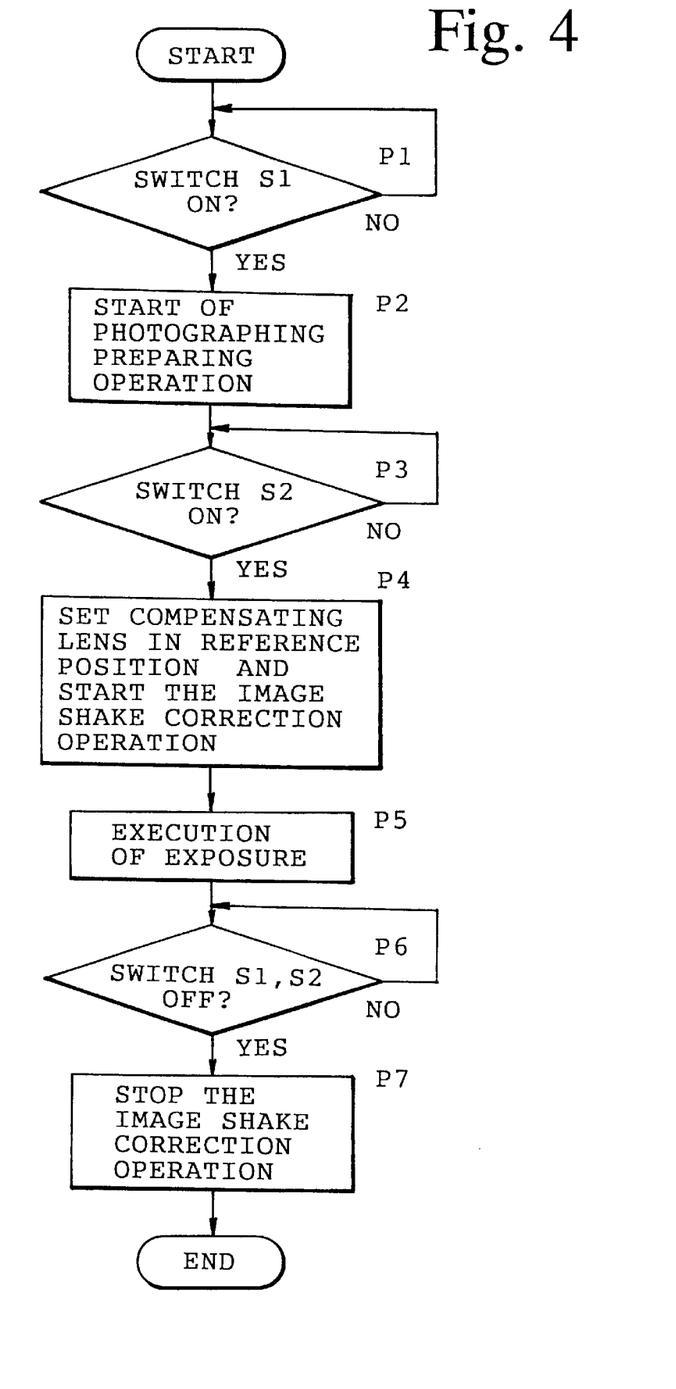
FIG. 4 is a flow chart showing an outline of control operations of the compensating lens drive unit.

Now, with reference to the flowchart of FIG. 4, an outline of a control operation executed by the CPU 21 for image shake correction operation of the compensating lens drive unit.

When there issues an output signal indicative of an ON state of a switch S1 which instructs the start of photographing preparing operations upon a first-stage depression (half-depression) of a shutter button of the camera (step P1) that is, if the switch S1 is ON, there are performed photographing preparing operations; more specifically, the focus control unit 25 is operated to measure the distance up to an object and perform an automatic focusing (AF) and the exposure control unit 26 is operated to measure the brightness of the object and determine an exposure value (step P2).

Upon turning ON of a photographing start switch S2 (step P3), image shake correction operations are started. First, an electric current of the reference position current value is fed to the wires 17X and 17Y of the shape memory alloy to heat the wires and set the compensating lens, which is at its initial position, to the reference position (stand-by position).

Next, an amount of compensation for the image shake correction is calculated in the CPU 21 on the basis of shake magnitudes in X and Y axis directions of the camera detected by the hand-shake sensors 22X and 22Y, respectively, and current value data for heating wires 17X and 17Y corresponding to the amount of image shake correction stored in the memory 24 is read, then on the basis of the current value thus read an electric current is fed to the wires 17X and 17Y via the heating drive units 23X and 23Y and start image shake correction operation (step P4).

Exposure is executed while the image shake correction operation is carried out (step P5). Upon output of OFF signals from the switches S1 and S2 (step P6), it is judged that the photographing is over, and the supply of electric current to the wires 17X and 17Y is interrupted to stop the image shake correction operation (step P7).

The following description is now provided about the period from the time when there issued a start command for image shake correction operation (turning ON of the photographing start switch S2) until the time when the image shake correction operation is started by heating wires 17X and 17Y of the shape memory alloy.

Figure 5A:
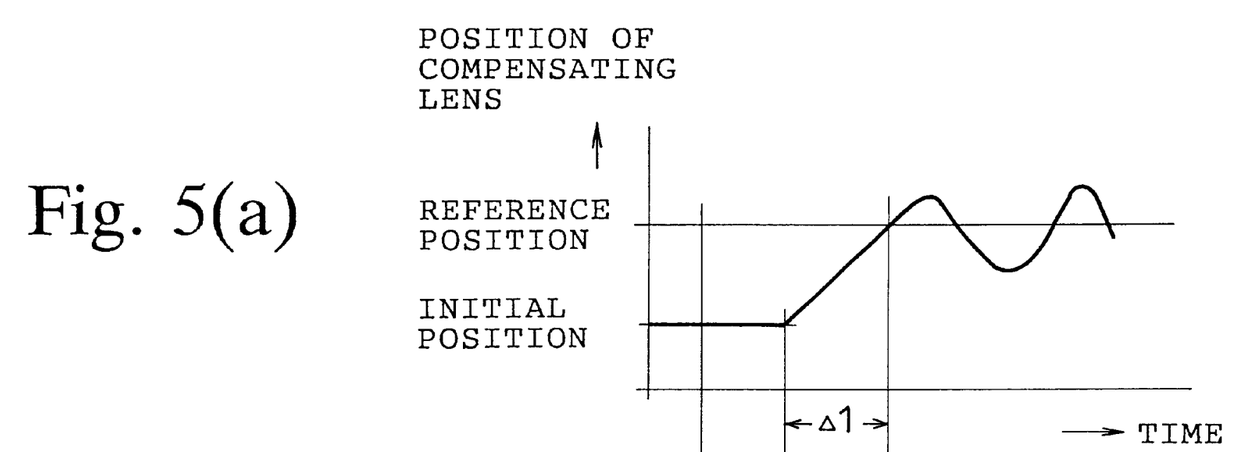
FIGS. 5(a) and 5(b) are timing charts illustrating a command timing for starting an image shake correction and an image shake correcting operation start timing in a compensating optical system using a conventional shape memory alloy.
Figure 5B:
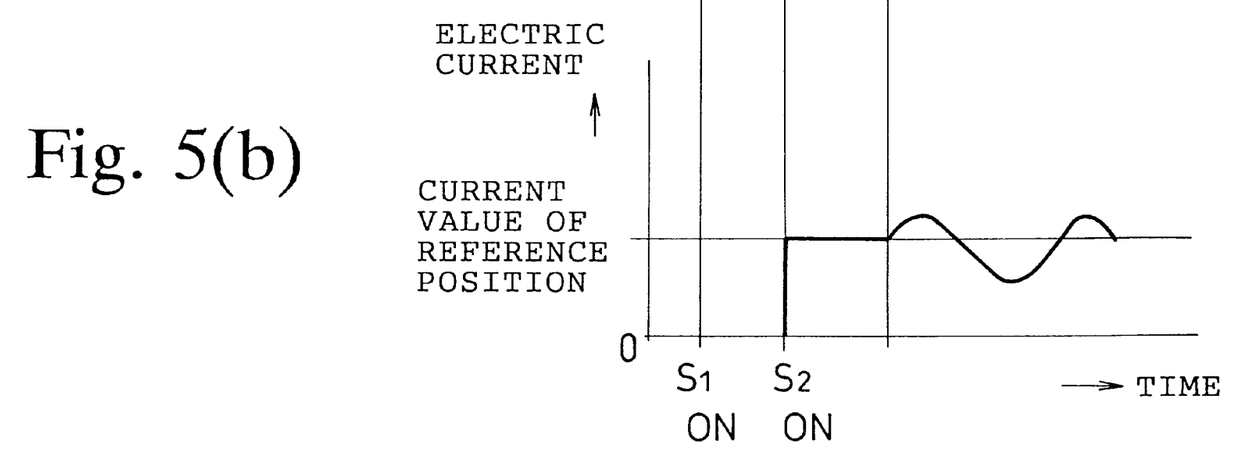

FIGS. 5(a) and 5(b) are timing charts illustrating the period from the issuance of an image shake correction start command (turning ON of the photographing start switch S2) in a compensating optical system using a conventional shape memory alloy wire until the start of the image shake correction operation.

FIG. 5(a) shows positions of the compensating lens from the time when the switch S2 turns ON and FIG. 5(b) shows the magnitude of an electric current fed to the wire from the time when the switch S2 turns ON.

Upon turning ON of the photographing start switch S2, an electric current of the reference position current value is fed to the wire to heat, whereby the wire is transformed and moves the compensating lens, which is in its initial position, to the reference position.

After the compensating lens has once been set at the reference position, the image shake correction operation is started.

The movement of the compensating lens from the initial position to the reference position involves a certain time lag $\Delta 1$, which is about 600 milliseconds (600 ms) according to the result of an experiment. Therefore, from the time when the photographing start switch S2 turns ON until the time when the image shake correction operation is started and exposure is executed, there arises a considerable time lag.

In the case where the magnitude of image shake is relatively large even after the start of the image shake correction operation, the heating current value corresponding to the amount of image shake also becomes large. But if such a large current is allowed to flow, a displacement corresponding to the amount of compensation will not occur quickly in the wire of the shape memory alloy and hence it is impossible to move the compensating lens quickly to the image shake correction position.

FIGS. 6(a), 6(b), 6(c) and FIGS. 7(a), 7(b), 7(c) illustrate a relation among the amount of the image shake correction S corresponding to the magnitude of hand-shake, an electric current value I applied to a shape memory alloy wire, and a displacement D of the compensating lens from the reference position, in the compensating optical system using a conventional shape memory alloy wire.

Figure 6A:
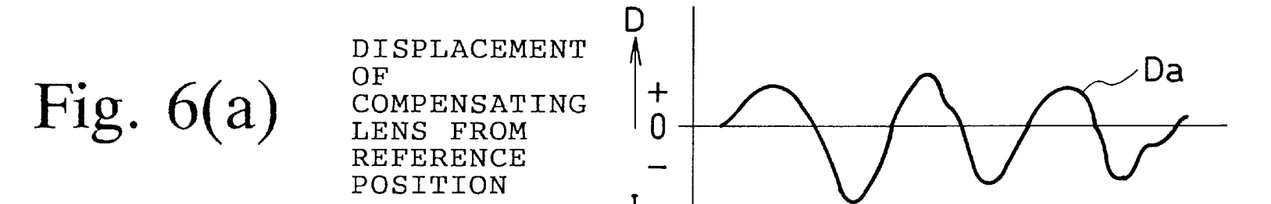
FIGS. 6(a), 6(b) and 6(c) are diagrams illustrating a relation among the amount of image shake correction, the magnitude of an electric current supplied to a wire of a shape memory alloy, and the position of the compensating lens of the compensating optical system using a conventional shape memory alloy.
Figure 6B:
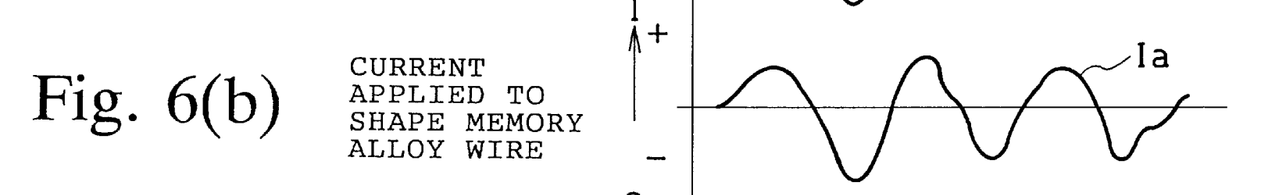
Figure 6C:
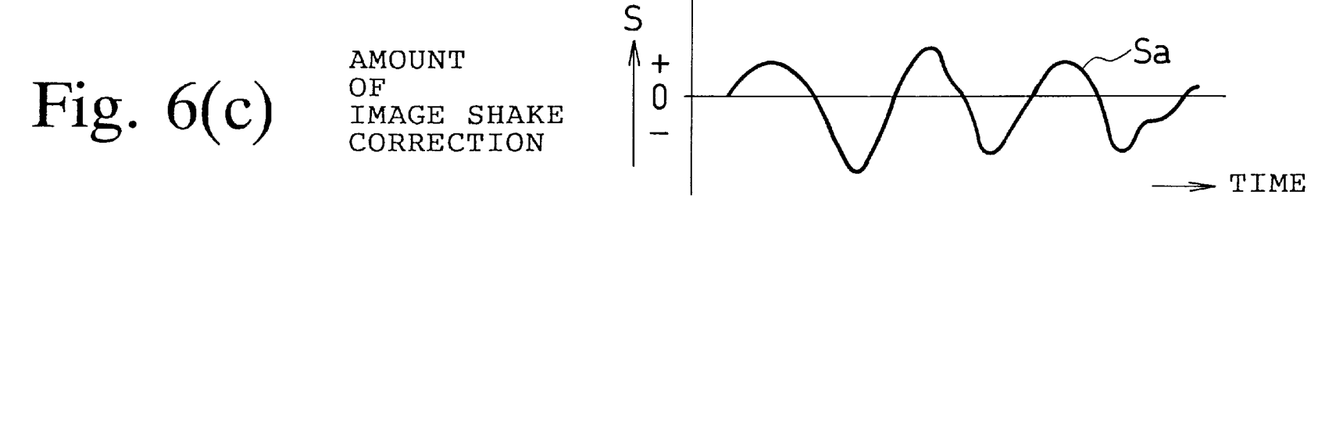
Figure 7A:
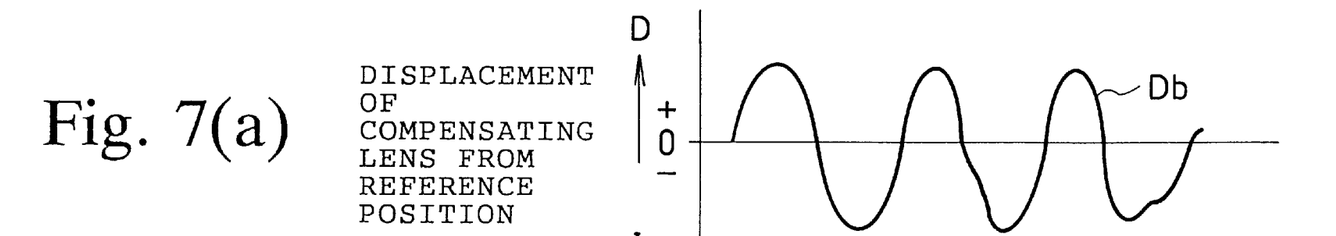
FIGS. 7(a), 7(b) and 7(c) are diagrams similar to FIGS. 6(a) to 6(c)
Figure 7B:
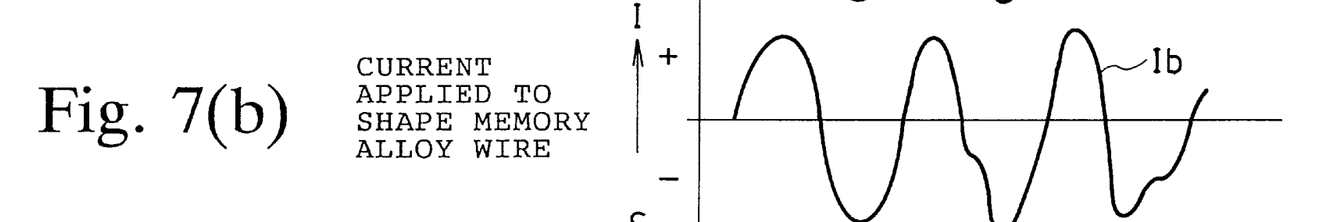
Figure 7C:
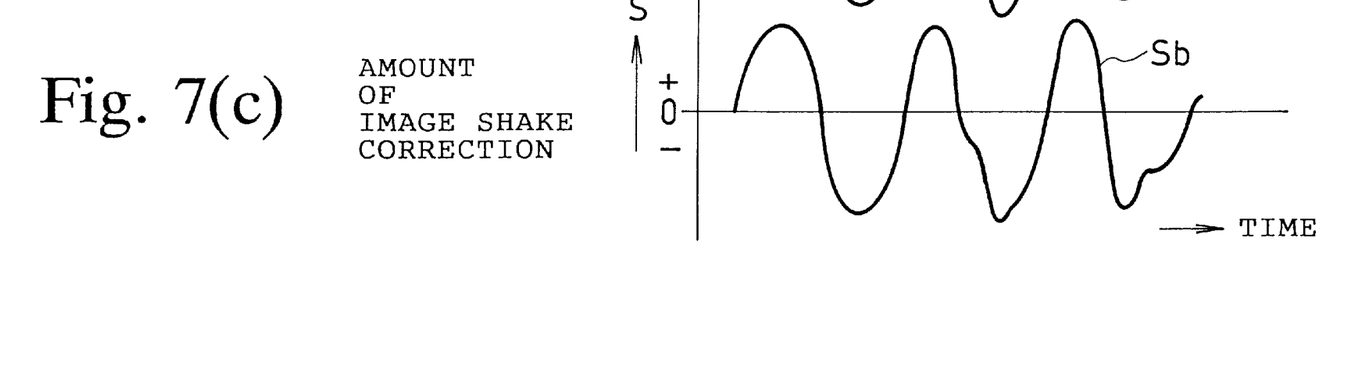

The relation shown in FIGS. 6(a) to 6(c) is of the case where the magnitude of image shake magnitude is relatively small, while the relation shown in FIGS. 7(a) to 7(c) is of the case where the image shake magnitude is relatively large.

In a case where the magnitude of image shake is relatively small, when the compensating lens has been set to the reference position and the image shake correction operation has been started from the reference position, as shown in FIGS. 6(a) to 6(c), the heating current value Ia corresponding to the amount of image shake correction Sa is also small and a nearly proportional relation is maintained among the amount of image shake correction Sa, current value Ia, and displacement Da, further, the displacement Da from the reference position corresponding to the amount of compensation Sa arises rapidly in the wire, thus posing no special problem.

However, when the magnitude of image shake is relatively large, a heating current value Ib corresponding to the amount of image shake correction Sb also becomes large. If such a large current is allowed to flow, a displacement Db from the reference position corresponding to the amount of compensation does not occur rapidly in the wire of the shape memory alloy. Consequently, the movement of the compensating lens based on the next-detected amount of image shake correction Sb is started while it is impossible to move the compensating lens to the image shake correction position. As a result, the compensation of image oscillation cannot be done to a satisfactory extent. This is as illustrated in FIGS. 7(a) to 7(c), in which the amount of image shake correction Sb and the current value Ib are in a proportional relation, but the current value Ib and the displacement Db are not proportional relation, and it is indicated the generation of only a small displacement.

In this embodiment, therefore, the time lag during the movement from the initial position of the compensating lens to the reference position is diminished, and even in case of a large amount of image shake correction there is rapidly generated a displacement corresponding to the amount of compensation to the wire of the shape memory alloy.

First, for diminishing the said time lag, in the case of setting the compensating lens from the initial position to the reference position, an electric current applied to the wire is set larger than the reference position current value.

Figures 8A, 8B:
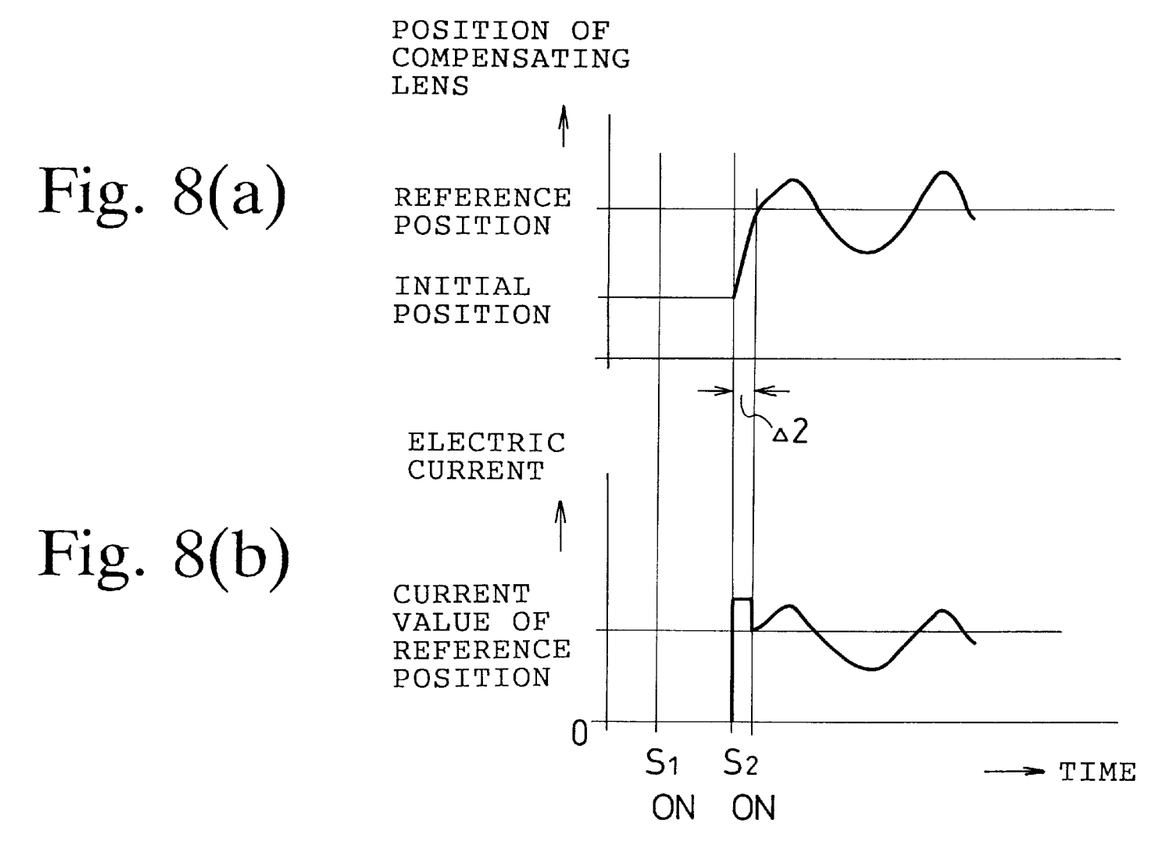
FIGS. 8(a) and 8(b) are timing charts illustrating a command timing for starting an image shake correction and an image shake correcting operation start timing in the compensating optical system.

FIGS. 8(a) and 8(b) are timing charts corresponding to timing charts of FIGS. 5(a) and 5(b) explained previously. FIG. 8(a) illustrates the position of the compensating lens from the time when the switch S2 turns ON and FIG. 8(b) illustrates the magnitude of an electric current applied to the wire from the time when the switch S2 turns ON.

That is, upon turning ON of the switch S2, the wire is heated electrically and is transformed into a memorized shape, thereby causing the compensating lens to move from the initial position to the reference position.

At this time, a larger electric current than the reference position current value is fed to the wire of the shape memory alloy to increase the transforming speed, and after arrival of the compensating lens at the reference position, the magnitude of the applied electric current is switched into the reference position current value. As a result, the time lag during the movement of the compensating lens Δ2 from the initial position to the reference position could be shortened to about 150 ms.

Figure 9A:
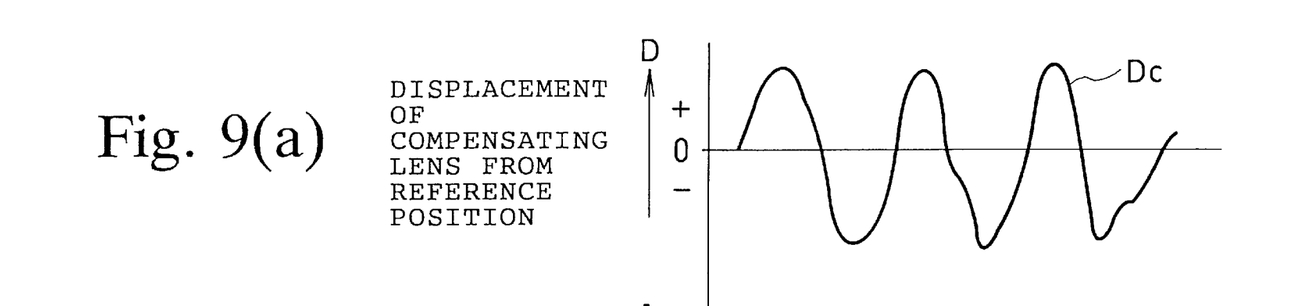
FIGS. 9(a), 9(b) and 9(c) are diagrams illustrating a relation among the amount of image shake correction, the magnitude of an electric current supplied to a wire of a shape memory alloy, and the position of the compensating lens, in the compensating optical system.
Figure 9B:
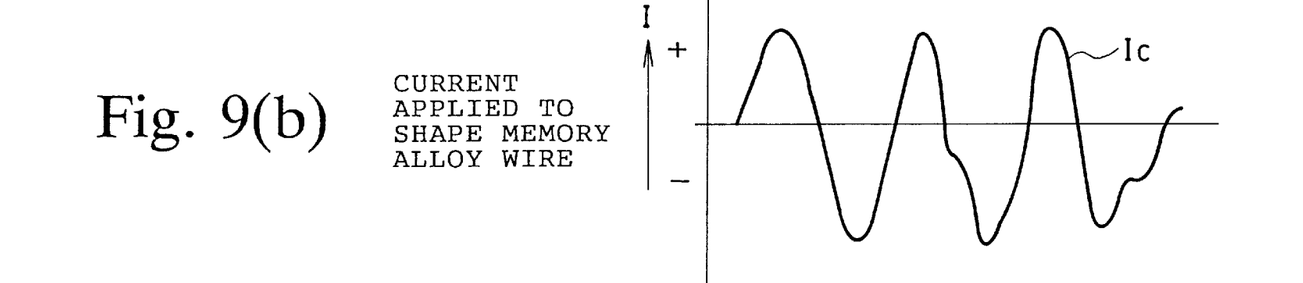
Figure 9C:
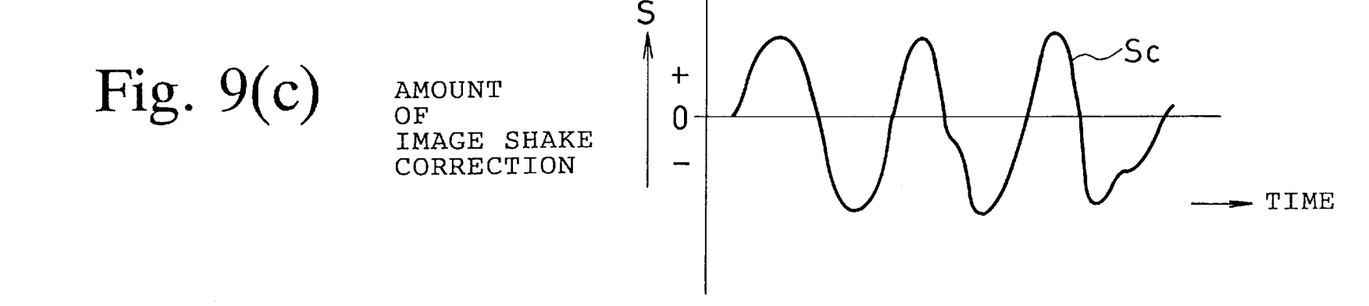

FIGS. 9(a), 9(b) and 9(c) illustrate a relation among the amount of image shake correction S, an electric current value I applied to the wire of the shape memory alloy, and a displacement D of the compensating lens from the reference position, in the case where the amount of image shake is relatively large. These figures correspond to the case of a relatively large magnitude of image shake which has been explained previously with reference to FIGS. 7(a) to 7(c).

That is, when the compensating lens is set at the reference position and the image shake correction operation is started from the reference position, if the amount of image shake is relatively large, then, as explained earlier with reference to FIGS. 6(a) to 6(c), the heating current value I corresponding to the amount of image shake correction is also small, a substantially proportional relation is ensured among the amount of compensation S, current value I, and displacement D, and a displacement D from the reference position corresponding to the amount of image shake correction S is developed rapidly in the wire, thus posing no special problem.

On the other hand, when the amount of image shake is large, the heating current value I corresponding to the amount of image shake correction S also becomes large, as shown in FIGS. 9(a) to 9(c).

However, even if an electric current of the heating current value I corresponding to the amount of image shake correction S is allowed to flow, heating is not performed in an instant, nor is rapidly developed a displacement corresponding to the amount of image shake correction in the wire of the shape memory alloy, and thus the compensating lens cannot be moved to the image shake correction position.

Also in the case of making displacement in a minus (−) direction, the radiation of heat is not performed in an instant even if the heating current value I is decreased to a value corresponding to the amount of image shake correction S, thus making it impossible to move the compensating lens to the image shake correction position.

To avoid such an inconvenience, in the case where the amount of image shake in the plus (+) direction is relatively large, an electric current of a current value Ic larger than a heating current value corresponding to the amount of image shake correction Sc is fed to the wire of the shape memory alloy, while in the case where the amount of image shake in the minus (−) direction is relatively large, an electric current of a current value Ic smaller than a heating current value corresponding to the amount of image shake correction Sc is applied to the wire so that a displacement Dc corresponding to the amount of image shake correction is developed rapidly. Such a rapid development of the displacement permits the image shake correction operation to be carried out in a satisfactory manner.

Thus, in the case of supplying an electric current of a current value corresponding to a larger displacement than the amount of image shake correction, there is a fear that there may occur a displacement larger than the amount of correction required, but this fear can be eliminated by first supplying an electric current larger than the amount of image shake correction and by subsequently making control so as to approximate the current value gradually to the amount of image shake correction.

An example has been described above in which the actuator using a shape memory alloy according to the present invention is applied to a compensating optical system for correcting image shake caused by hand-shake of a camera. But it goes without saying that this actuator is also applicable as a drive source in an operating mechanism for a flash unit retaining member of a camera or in any of various other devices, in addition to the compensating optical system.

In the actuator using a shape memory alloy according to the present invention, as set forth hereinabove, at the time of start-up of a device, for example at the time of moving a driven member from its initial position to the reference position in operation or in the case where the amount of movement of the driven member is larger than the usual amount of movement thereof, an electric current larger than a current value obtained from the amount of movement is fed to an actuating member formed of a shape memory alloy, which actuating member is thereby controlled so as to generate a displacement rapidly.

In this way, even when the difference between the transformation start temperature of the shape memory alloy and the heating start temperature (usually a normal temperature) is large, it is possible to greatly diminish the time lag based on the temperature difference from the time when an operation start signal for a device is outputted until the start of actual operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. The actuator using a shape memory alloy, comprising:

an actuating member constructed of a shape memory alloy and in which a predetermined shape is memorized in advance;

a driven member which is driven by the actuating member;

a power supply which supplies electric power to the actuating member; and a control unit which controls so that the electric power is fed from the power supply to the actuating member to heat the actuating member, causing the actuating member to transform to the memorized shape and causing the driven member to move to a predetermined position, wherein the control unit variably controls the electric current fed from the power supply to the actuating member in correspondence with displacement of the driven member, and when the driven member is to be moved to the predetermined position, electric current having a value that is larger than the value of electric current necessary for positioning the driven member to the predetermined position is fed to the actuating member, to move the driven member.

2. An actuator of claim 1, wherein the driven member is a compensating member for correcting image shake caused by shake of a camera.

3. The actuator of claim 2, wherein the control unit controls so that when the amount of shake of the camera exceeds a preset value, an electric current of a value larger than the value of the electric current fed to the actuating member for restoring the actuating member to the memorized shape is fed to the actuating member to move the driven member.

4. An actuator of claim 1, wherein the driven member is a holding member for a compensating lens which is for correcting image shake caused by shake of a camera.

5. An actuator of claim 1, wherein the driven member is a flash unit retaining member of a camera.

6. The actuator of claim 1, wherein the driven member has a resilient urging member for urging the driven member, the resilient urging member having a biasing force acting in a direction opposite to an acting direction of a biasing force of the actuating member.

7. An actuator using a shape memory alloy, comprising:

an actuating member constructed of a shape memory alloy, the actuating member being fixed at one end thereof and supported movably at an opposite and thereof by a driven member;

an urging member which exerts a force on the movably supported end of the actuating member, said force acting in a direction opposite to a direction in which the actuating member is displaced to its original state by heating;

a power supply which supplies electric power for heating the actuating member; and a control unit which variably controls an electric current fed from the power supply to the actuating member in correspondence with displacement of the driven member, wherein the control unit controls the electric current fed so that electric current corresponding to a displacement of the driven member larger than a target displacement of the driven member is fed from the power supply to the actuating member when transformed.

8. An actuator of claim 7, wherein the driven member is a compensating member for correcting image shake caused by shake of a camera.

9. The actuator of claim 7, wherein the control unit controls so that an electric current of a value larger than an electric current value corresponding to the target displacement is supplied when the actuating member is displaced in its heat-displacement direction.

10. The actuator of claim 7, wherein the control unit controls so that an electric current smaller than an electric current value corresponding to the target displacement is supplied when the actuating member is displaced in a direction opposite to its heat-displacement direction.

11. An actuator of claim 7, wherein the control unit controls so that an electric current of an electric current value corresponding to the target displacement is supplied when the amount of displacement of the actuating member is smaller than a predetermined amount of displacement thereof.

12. A method for controlling an actuator using a shape memory alloy adapted to be displaced by heating, wherein an electric current is fed to an actuating member formed of the shape memory alloy, thereby causing a driven member to move to a predetermined position, the method including the steps of:

determining a first electric current value corresponding to a target position to which the driven member is to be moved; and supplying an electric current of a second electric current value different from the first electric current value to the actuating member, the second electric current value corresponding to a position spaced away from the target position of the driven member.

13. The method of claim 12, furthering including the step of:

supplying the electric current of the first electric current value to the actuating member after the driven member has reached the target position.

* * * * *